United States Patent
Song

(10) Patent No.: US 9,677,519 B2
(45) Date of Patent: Jun. 13, 2017

(54) DEVICE FOR DECREASING FUEL PULSATION OF LPG VEHICLE

(71) Applicants: Hyundai Motor Company, Seoul (KR); Kia Motors Corporation, Seoul (KR)

(72) Inventor: Jin Oh Song, Hwaseong-si (KR)

(73) Assignees: Kia Motors Corporation, Seoul (KR); Hyundai Motor Company, Seoul (KR)

( * ) Notice: Subject to any disclaimer, the term of this patent is extended or adjusted under 35 U.S.C. 154(b) by 646 days.

(21) Appl. No.: 14/098,228

(22) Filed: Dec. 5, 2013

(65) Prior Publication Data

US 2015/0059701 A1 Mar. 5, 2015

(30) Foreign Application Priority Data

Aug. 27, 2013 (KR) .......................... 10-2013-0101735

(51) Int. Cl.
*F02M 21/02* (2006.01)
*F02M 37/00* (2006.01)

(52) U.S. Cl.
CPC .... *F02M 37/0041* (2013.01); *F02M 21/0212* (2013.01); *F02M 21/0239* (2013.01); *Y02T 10/32* (2013.01)

(58) Field of Classification Search
USPC ........................................................ 123/445
See application file for complete search history.

(56) References Cited

U.S. PATENT DOCUMENTS

| 5,934,251 A * | 8/1999 | Jacobs ............... F02M 37/0029 123/447 |
| 6,901,913 B1 * | 6/2005 | Tsuchiya ................. F02M 55/04 123/456 |
| 7,870,871 B1 * | 1/2011 | Hanjagi ............. F02M 37/0041 138/26 |
| 2006/0225800 A1 * | 10/2006 | Weber .................... F02M 55/04 138/31 |
| 2007/0169751 A1 * | 7/2007 | Tominaga ............ F02M 55/025 123/456 |
| 2011/0186015 A1 * | 8/2011 | Hanjagi ............. F02M 37/0041 123/457 |
| 2012/0251359 A1 | 10/2012 | Neelakantan et al. |
| 2013/0199499 A1 * | 8/2013 | Pursifull ............ F02M 21/0239 123/456 |

(Continued)

FOREIGN PATENT DOCUMENTS

JP 5-155320 A 6/1993
JP 3893711 * 3/2007

(Continued)

*Primary Examiner* — Erick Solis
(74) *Attorney, Agent, or Firm* — Morgan Lewis & Bockius LLP

(57) ABSTRACT

A device for decreasing fuel pulsation of an LPG vehicle may include a bombe storing LPG fuel therein, a regulator connected to the bombe and adjusting a temperature and pressure of the LPG fuel, an injector spraying the LPG fuel supplied from the regulator to an engine, a fuel line connecting the bombe, the regulator, and the injector to supply or collect the fuel, and a pulsation damper provided between the regulator and the injector in the fuel line and have a plurality of pistons slidably coupled each other for decreasing the fuel pulsation.

6 Claims, 4 Drawing Sheets

(56) References Cited

U.S. PATENT DOCUMENTS

| | | | | |
|---|---|---|---|---|
| 2014/0123947 A1* | 5/2014 | Song | ................ | F02M 39/00 |
| | | | | 123/446 |
| 2015/0059701 A1* | 3/2015 | Song | ................ | F02M 21/0212 |
| | | | | 123/445 |
| 2015/0226166 A1* | 8/2015 | Hong | ................ | F02M 55/025 |
| | | | | 123/456 |

FOREIGN PATENT DOCUMENTS

| | | | |
|---|---|---|---|
| JP | 2011-51469 A | | 3/2011 |
| JP | 2011051469 A | * | 3/2011 |
| KR | 10-0348349 B1 | | 7/2002 |
| KR | 10-2007-0064473 A | | 6/2007 |
| KR | 10-2009-0114686 A | | 11/2009 |

* cited by examiner

DEVICE FOR DECREASING FUEL PULSATION OF LPG VEHICLE

CROSS-REFERENCE TO RELATED APPLICATION

The present application claims priority to Korean Patent Application No. 10-2013-0101735, filed on Aug. 27, 2013, the entire contents of which is incorporated herein for all purposes by this reference.

BACKGROUND OF THE INVENTION

Field of the Invention

The present invention relates to a device for decreasing fuel pulsation of a Liquefied Petroleum Gas (LPG) vehicle, and more particularly, to a device for decreasing fuel pulsation of an LPG vehicle and for decreasing noise caused by the fuel pulsation from a fuel line of the LPG vehicle.

Description of Related Art

In general, an LPG vehicle has a structure in which an LPG is compressed using a fuel pump (+5 bar compared to fuel tank pressure) so as to be maintained in a liquid state and which sprays the LPG through an injector.

This LPG vehicle includes a fuel tank having LPG fuel stored therein, the injector installed at one side of an engine so as to spray a fuel, and a pressure regulator installed at a fuel line connected between the injector and the fuel tank to uniformly regulate pressure.

Therefore, an electronic control unit (ECU) calculates a state of the fuel using a fuel temperature sensor and a pressure sensor and drives the injector at an appropriate time to spray the fuel.

In this case, the fuel pump is driven to supply the fuel, the fuel is supplied through the regulator and a supply line by driving the fuel pump, and the fuel is sprayed through the injector.

In this case, when a fuel pressure in an engine housing compared to a pressure in the fuel tank is a pressure set by the pressure regulator or more, a diaphragm in the regulator is opened, such that the remaining fuel after spraying is returned to the through a return line.

However, a device for supplying the fuel of an LPG vehicle according to the related art may introduce noise caused by the fuel pulsation into an interior of the vehicle through the regulator mounted on a dash panel and may also cause the noise to be introduced into the interior by the fuel pulsation in a fuel pipe assembled with an underbody of the vehicle.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a device for decreasing fuel pulsation of an LPG vehicle capable of decreasing noise caused by the fuel pulsation from a fuel line of the LPG vehicle.

In an aspect of the present invention, a device for decreasing fuel pulsation of an LPG vehicle, may include a fuel tank storing LPG fuel therein, a regulator connected to the fuel tank and adjusting a temperature and pressure of the LPG fuel, an injector spraying the LPG fuel supplied from the regulator to an engine, a fuel line connecting the fuel tank, the regulator, and the injector to supply or collect the fuel, and a pulsation damper provided between the regulator and the injector in the fuel line and may have a plurality of pistons slidably coupled to each other for decreasing the fuel pulsation.

The pulsation damper may include a housing including a first end having a first through-hole formed therein and a second end opened, a first piston slidably provided in the housing and may have an opened first end, a first elastic body slidably inserted into the first piston, a second piston inserted into the first piston and may have a first end opened, a second elastic body positioned at a closed second end of the second piston to elastically the second piston, and a cover coupled to the second end of the housing.

The first piston may have a plurality of fuel holes formed on a closed second end thereof.

The second piston may include a buffer space that is formed at the opened first end and fluidly-communicates with the fuel holes of the first piston.

The device may further include a first connection line having a first end inserted into the fuel line and a second end inserted into the first through-hole of the housing, and a second connection line having a first end fluid-connected to the cover and a second end inserted into the fuel line.

The fuel line may include a supplying pipe introduced with the LPG fuel from the fuel tank and connected to the regulator, the pulsation damper, and the injector, and a collecting pipe connecting the regulator and the fuel tank to each other.

The regulator may include a temperature and pressure sensor detecting the temperature and pressure of the LPG fuel supplied or collected through the fuel line.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
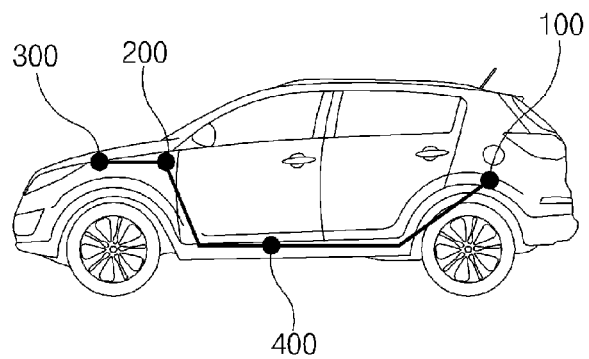
FIG. 1 is a view showing a vehicle in which a device for decreasing fuel pulsation of an LPG vehicle according to an exemplary embodiment of the present invention is mounted.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Exemplary embodiments of the present invention will be described in detail with reference to the accompanying drawings.

As shown in FIGS. 1 to 6, the device for decreasing fuel pulsation of the LPG vehicle according to the exemplary embodiment of the present invention may include a fuel tank 100 storing LPG fuel of a vehicle, a regulator 200 connected to the fuel tank 100, an injector 300 spraying the fuel supplied from the regulator 200, a fuel line connecting the fuel tank 100, the regulator 200, and the injector 300, and a pulsation damper 500 provided between the regulator 200 and the injector 300 to decrease the fuel pulsation.

Figure 2:
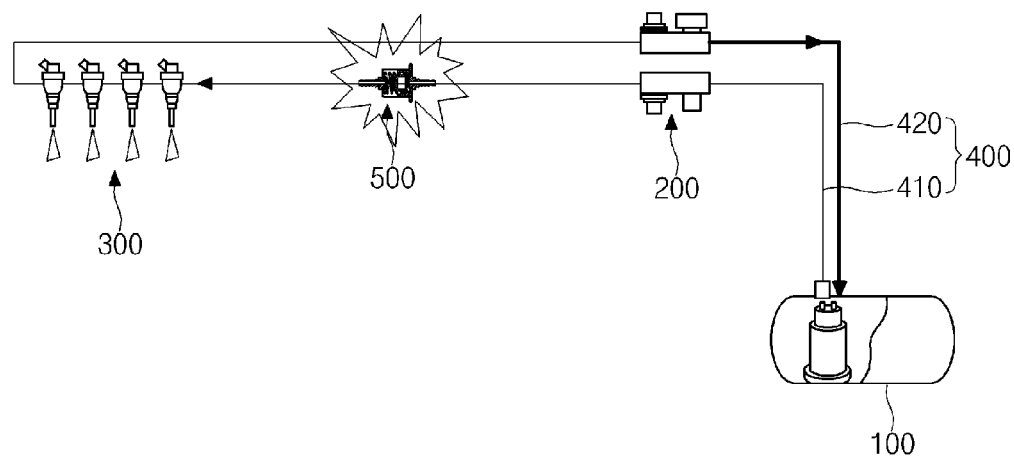
FIG. 2 is a structure view of the device for decreasing fuel pulsation of the LPG vehicle according to the exemplary embodiment of the present invention.

As shown in FIGS. 1 and 2, the fuel tank 100 having a configuration capable of storing the fuel may store a predetermined amount of LPG fuel by having a predetermined volume and may include a fuel pump so as to supply the fuel to the injector 300 described below.

In this case, a valve may be provided over the fuel tank 100 so as to control a flow of the fuel.

The regulator 200 is connected to the fuel tank 100 so as to adjust a temperature and pressure of the LPG fuel and serve as to maintain the fuel supplied from the fuel tank 100 at a predetermined pressure and to supply the fuel to the injector 300.

Here, the regulator 200 may adjust the temperature and pressure of the fuel by including temperature and pressure sensors detecting the temperature and pressure of the LPG fuel supplied or collected through the fuel line 400.

The injector 300 is provided to an engine side to spray the fuel supplied from the regulator 200 to the engine.

The fuel line 400, which is a pipe connecting the fuel tank 100, the regulator 200, and the injector 300, enable the LPG fuel stored in the fuel tank 100 to be supplied to the injector 300 via the regulator 200 and the fuel to be sprayed to the engine.

In this case, the fuel line 400 is introduced with the LPG fuel from the fuel tank 100 and may have a supplying pipe 410 connected to the regulator 200, the pulsation damper 500, and the injector 300, and a collecting pipe 420 connecting the regulator 200 and the fuel tank 100 to each other.

Figure 3:
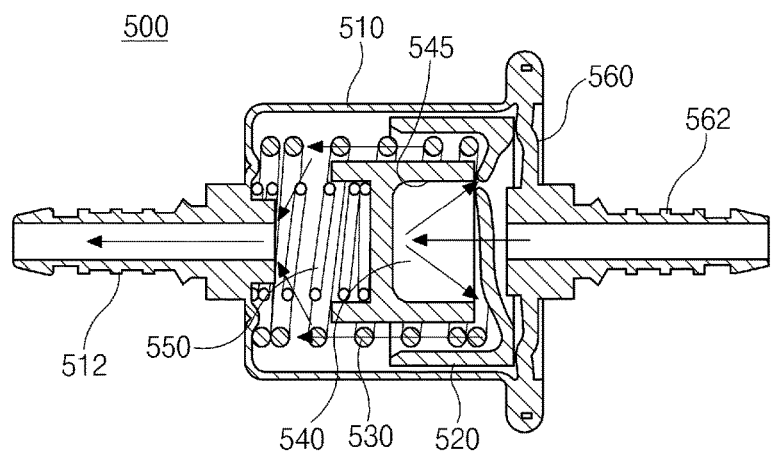
FIG. 3 is a cross-sectional view showing a fuel flow in a pulsation damper of the device for decreasing fuel pulsation of the LPG vehicle according to an exemplary embodiment of the present invention.
Figure 4:
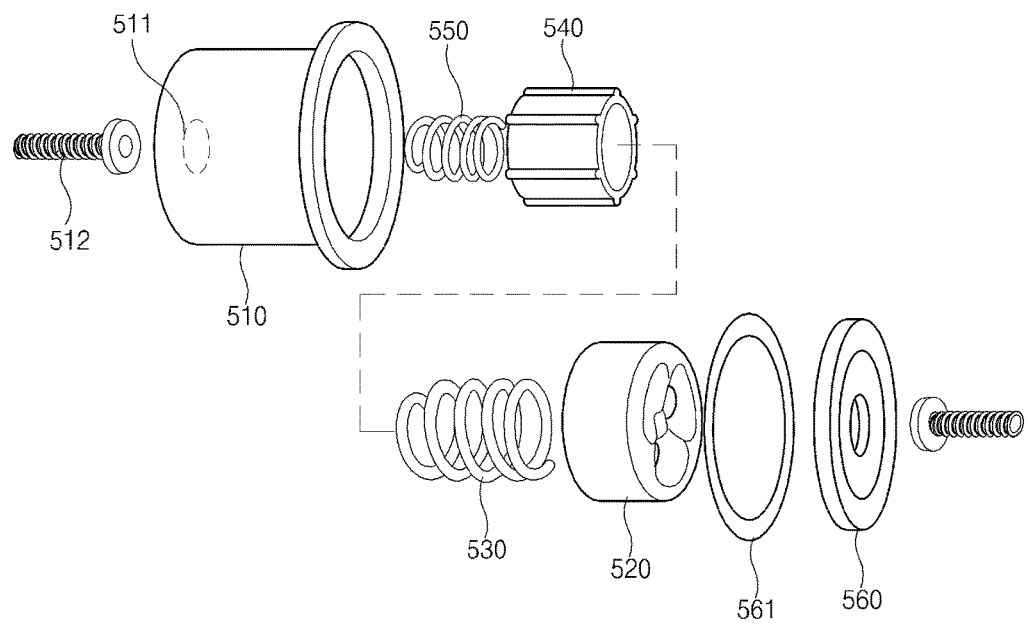
FIG. 4 is an exploded perspective view showing the pulsation damper of the device for decreasing fuel pulsation of the LPG vehicle according to the exemplary embodiment of the present invention.

As shown in FIGS. 2 to 4, the pulsation damper 500 has a structure in which a plurality of pistons are coupled and is provided between the regulator 200 and the injector 300 on the supplying pipe 410 of the fuel line 400, thereby decreasing the fuel pulsation.

The pulsation damper 500 has a first piston 520 and a second piston 540 inserted into a housing 510, a first elastic body 530 and a second elastic body 550 inserted into the first piston 520 and the second piston 540, and a cover 560 closing the housing 510.

The housing 510 has a cylindrical shape, has a first through-hole 511 formed on a closed one end surface (a left direction in the drawings) thereof, and has the other end (a right direction in the drawings) in an opened state.

The first piston 520 has a cylindrical shape, such that an opened one end thereof is inserted into one end surface side in the housing 510.

The first elastic body 530, which is inserted into the first piston 520, has one end positioned at one end surface in the housing 510 and the other end positioned at the closed other side surface of the first piston 520, thereby elastically supporting the first piston 520 and the housing 510. In this case, the first elastic body 530 may have elastic force of 1.5 to 4.0 kgf.

The second piston 540 has a cylindrical shape including a buffer space 545, such that the other end opened thereof is inserted into the first piston 520.

The second elastic body 550, which is inserted into the second piston 540, has one end positioned at a closed spherical surface of the second piston 540 and the other end positioned at a closed spherical surface in the housing 510, thereby elastically supporting the second piston 540 and the housing 510. In this case, the second elastic body 550 may have elastic force of 1.0 to 3.0 kgf.

The cover 560 has a disc shape, is inserted into the opened surface of the other end of the housing 510, and has a second through-hole formed at the center thereof.

In this case, the opened surface of the housing 510 and the cover 560 has a coupling member 561 provided therebetween, such that coupling force between the housing 510 and the cover 560 may be improved and water tightness in the housing 510 may be improved.

In addition, the pulsation damper 500 is provided with a first connection line 512 having a pipe shape in which one end is inserted into the fuel line 400 and the other end is inserted into the first through-hole 511 of the housing 510, and a second connection line 562 having a pipe shape in which one end is inserted into the second through-hole 561 of the cover 560 and the other end is inserted into the fuel line 400, such that the fuel may be supplied thereto.

Figure 5A:
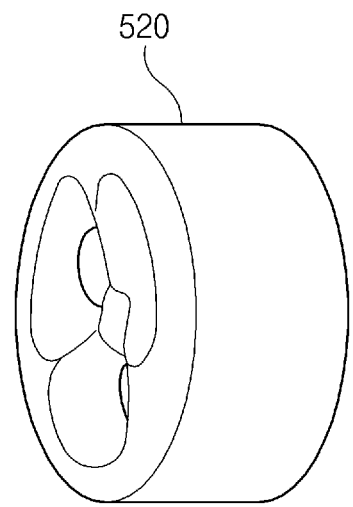
FIG. 5a is a view showing a first piston in the pulsation damper of the device for decreasing fuel pulsation of the LPG vehicle according to the exemplary embodiment of the present invention.
Figure 5B:
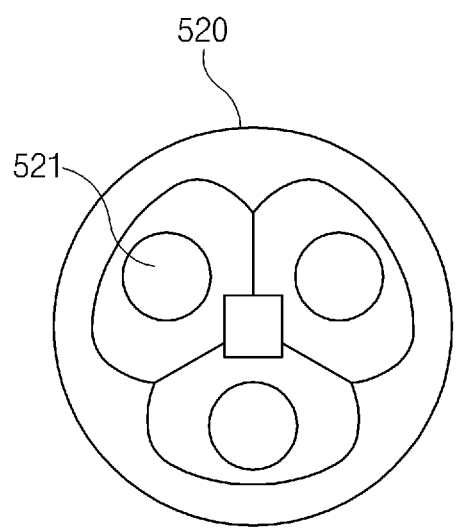
FIG. 5b is a view showing a first piston in the pulsation damper of the device for decreasing fuel pulsation of the LPG vehicle according to the exemplary embodiment of the present invention.
Figure 6A:
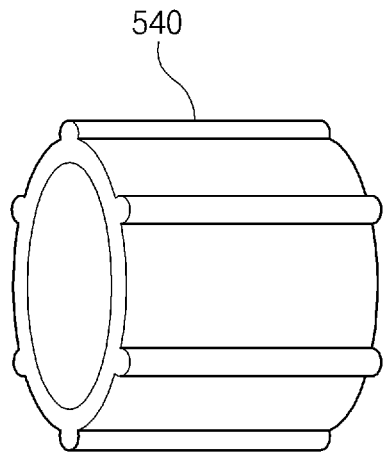
FIG. 6a is a view showing a second piston in the pulsation damper of the device for decreasing fuel pulsation of the LPG vehicle according to the exemplary embodiment of the present invention.
Figure 6B:
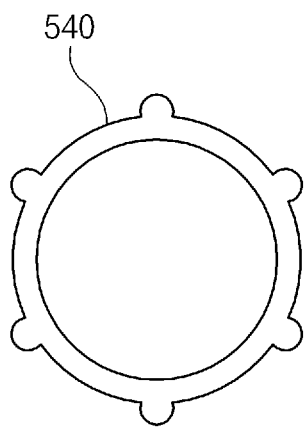
FIG. 6b is a view showing a second piston in the pulsation damper of the device for decreasing fuel pulsation of the LPG vehicle according to the exemplary embodiment of the present invention.

In this case, the first piston 520 has a plurality of fuel holes 521 formed at the closed spherical surface of the other end side thereof, where three fuel holes 521 are formed at an interval of 120° as shown in FIG. 5, and the second piston 540 is not separately provided with the hole as shown in FIG. 6.

As a result, as shown in FIG. 3, the fuel introduced through the second connection line 562 is introduced into the first piston 520 of the pulsation damper 500 and then is discharged into the housing 510 through the fuel hole 521, and the fuel discharged into the housing 510 is supplied to the injector 300 through the first connection line 512.

In this case, the fuel may be introduced into a buffer space 545 of the second piston 540 through the fuel holes 521. Accordingly, the pulsation caused during the flow of the fuel is decreased by the first elastic body 530 provided in the first piston 520, the buffer space 545 of the second piston 540, and the second elastic body 550 provided in the second piston 540, thereby making it possible to minimize vibration generated from the fuel line 400 through the pulsation damper 500.

As such, according to the exemplary embodiment of the present invention, the pulsation damper 500 having the first piston 520 including the first elastic body 530 and the second piston 540 including the second elastic body 550 is provided in the supplying pipe 410 of the fuel line 400, such that the noise caused by pulsation of the fuel may be prevented and marketability may be improved.

As set forth above, according to the exemplary embodiment of the present invention, the pulsation damper is used in the fuel line of the LG vehicle to decrease the pulsation in the damper, thereby making it possible to minimize the noise generation to increase marketability.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A device for decreasing fuel pulsation of a Liquefied Petroleum Gas (LPG) vehicle, the device comprising:
    a fuel tank storing LPG fuel therein;
    a regulator connected to the fuel tank and adjusting a temperature and pressure of the LPG fuel;
    an injector spraying the LPG fuel supplied from the regulator to an engine;
    a fuel line connecting the fuel tank, the regulator, and the injector to supply or collect the LPG fuel; and
    a pulsation damper provided between the regulator and the injector in the fuel line and have a plurality of pistons slidably coupled each other for decreasing the fuel pulsation,
    wherein the pulsation damper includes:
        a housing including a first end having a first thru-hole formed therein and a second end opened;
        a first piston slidably provided in the housing and having an opened first end;
        a first elastic body slidably inserted into the first piston and supported by a first end of the housing;
        a second piston inserted into the first piston and having a first end opened;
        a second elastic body positioned at a closed second end of the second piston and supported by the first end of the housing to elastically support the second piston; and
        a cover coupled to the second end of the housing.

2. The device according to claim 1, wherein the first piston has a plurality of fuel holes formed on a closed second end thereof.

3. The device according to claim 2, wherein the second piston includes a buffer space that is formed at the opened first end and fluidly-communicates with the fuel holes of the first piston.

4. The device according to claim 1 further comprising:
    a first connection line having a first end inserted into the fuel line and a second end inserted into the first thru-hole of the housing; and
    a second connection line having a first end fluidly-connected to the cover and a second end inserted into the fuel line.

5. The device according to claim 1, wherein the fuel line includes:
    a supplying pipe introduced with the LPG fuel from the fuel tank and connected to the regulator, the pulsation damper, and the injector, and
    a collecting pipe connecting the regulator and the fuel tank to each other.

6. The device according to claim 1, wherein the regulator includes a temperature and pressure sensor detecting the temperature and pressure of the LPG fuel supplied or collected through the fuel line.

\* \* \* \* \*